(12) United States Patent
Ramabhadran et al.

(10) Patent No.: US 9,641,063 B2
(45) Date of Patent: May 2, 2017

(54) SYSTEM AND METHOD OF COMPENSATING POWER FACTOR FOR ELECTRICAL LOADS

(71) Applicant: GENERAL ELECTRIC COMPANY, Schenectady, NY (US)

(72) Inventors: Ramanujam Ramabhadran, Niskayuna, NY (US); Gang Yao, Twinsburg, OH (US); Bruce Richard Roberts, Mentor-on-the-Lake, OH (US); Jeffrey Joseph Nasadoski, Gloversville, NY (US)

(73) Assignee: General Electric Company, Niskayuna, NY (US)

( * ) Notice: Subject to any disclaimer, the term of this patent is extended or adjusted under 35 U.S.C. 154(b) by 322 days.

(21) Appl. No.: 14/164,416

(22) Filed: Jan. 27, 2014

(65) Prior Publication Data

US 2015/0214833 A1   Jul. 30, 2015

(51) Int. Cl.
| | |
|---|---|
| *H02M 1/42* | (2007.01) |
| *H02M 1/44* | (2007.01) |
| *H02M 3/04* | (2006.01) |
| *H05B 33/08* | (2006.01) |

(52) U.S. Cl.
CPC ............ *H02M 1/42* (2013.01); *H02M 1/4225* (2013.01); *H02M 1/44* (2013.01); *H02M 3/04* (2013.01); *H05B 33/0809* (2013.01); *H05B 33/0815* (2013.01); *H05B 33/0851* (2013.01); *Y02B 20/347* (2013.01); *Y02B 70/126* (2013.01)

(58) Field of Classification Search
CPC .... H02M 1/4225; H02M 1/4258; H02M 1/42; H02M 1/4208; H02M 1/4241; H02M 1/4291
See application file for complete search history.

(56) References Cited

U.S. PATENT DOCUMENTS

| | | | |
|---|---|---|---|
| 4,306,283 A | 12/1981 | Kiwaki et al. | |
| 5,001,620 A | 3/1991 | Smith | |
| 5,687,070 A | 11/1997 | Jacobs et al. | |
| 7,053,569 B2 | 5/2006 | Takahashi | |

(Continued)

FOREIGN PATENT DOCUMENTS

| | | |
|---|---|---|
| EP | 2339726 A1 | 6/2011 |
| WO | 2011111005 A1 | 9/2011 |

(Continued)

OTHER PUBLICATIONS

PCT Search Report and Written Opinion from corresponding PCT Application No. PCT/US2015/010984 dated Apr. 7, 2015.

(Continued)

*Primary Examiner* — Harry Behm
(74) *Attorney, Agent, or Firm* — Pabitra K. Chakrabarti (57) ABSTRACT

A power factor controller (PFC) for an electrical load such as LED lighting includes a power factor correcting converter for generating a sinusoidal input current. The PFC further includes a programmable controller for estimating a phase shifted multiplier. A current regulator generates a desired PFC current in response to an input voltage, an output load and the phase shifted and subsequently blanked multiplier. The electrical load operates in response to the sinusoidal input current based at least partially on the desired PFC current.

20 Claims, 7 Drawing Sheets

(56) References Cited

U.S. PATENT DOCUMENTS

| | | | |
|---|---|---|---|
| 8,432,109 B2 | 4/2013 | Yang et al. | |
| 8,441,199 B2 | 5/2013 | Santo et al. | |
| 2008/0018261 A1* | 1/2008 | Kastner | F21V 23/00 315/192 |
| 2010/0207536 A1 | 8/2010 | Burdalski et al. | |
| 2012/0014148 A1* | 1/2012 | Li | H02M 1/4216 363/78 |
| 2012/0300517 A1 | 11/2012 | Zhang et al. | |
| 2013/0094255 A1* | 4/2013 | Yeh | H02M 1/4208 363/44 |
| 2013/0113381 A1* | 5/2013 | Cai | H05B 33/0815 315/122 |
| 2014/0043877 A1* | 2/2014 | Ishii | H02M 1/4225 363/84 |
| 2014/0185342 A1* | 7/2014 | Nieberlein | H02M 1/4208 363/84 |

FOREIGN PATENT DOCUMENTS

| | | | |
|---|---|---|---|
| WO | 2012138200 A2 | 10/2012 | |
| WO | 2013058722 A1 | 4/2013 | |

OTHER PUBLICATIONS

Souvik Chattopadhyay, et al. "Impedance emulation method for a single phase shunt active filter", APEC 2003, Feb. 9, 2003, vol. 2, pp. 907-912.

Ahmed et al., "Power Factor Improvement by Pulse Width Modulated Switched Single Capacitor", Power Electronics, 2006, IICPE 2006. India International Conference, pp. 212-215, Dec. 2006.

Frank, "A 48 V, 2 A High Efficiency, Single Stage, Isolated Power Factor Corrected Power Supply for LED Drivers and Telecom Power", Semiconductor Components Industries, LLC, pp. 1-11, Jan. 2010.

Eunchul et al., "A 6.8-W purely-resistive AC light-emitting diode driver circuit with 95% power factor", Power Electronics and ECCE Asia (ICPE & ECCE), 2011 IEEE 8th International Conference, pp. 778-781, Jun. 3, 2011.

* cited by examiner

SYSTEM AND METHOD OF COMPENSATING POWER FACTOR FOR ELECTRICAL LOADS

BACKGROUND

The subject matter of this disclosure relates generally to power factor correction, and more particularly, to a system and method for compensating for the leading current in an electrical load such as an LED driver input during light loading of the LED driver.

Power factor correctors (PFCs) are well known. Boost converters, Flyback converters, and other topologies are generally used to provide power factor correction for devices powered from an AC line. Input capacitors are typically placed both before and after the rectifier in a boost or other PFC converter to control electro-magnetic interference (EMI). The input capacitors adversely affect power factor (PF).

Figure 1:
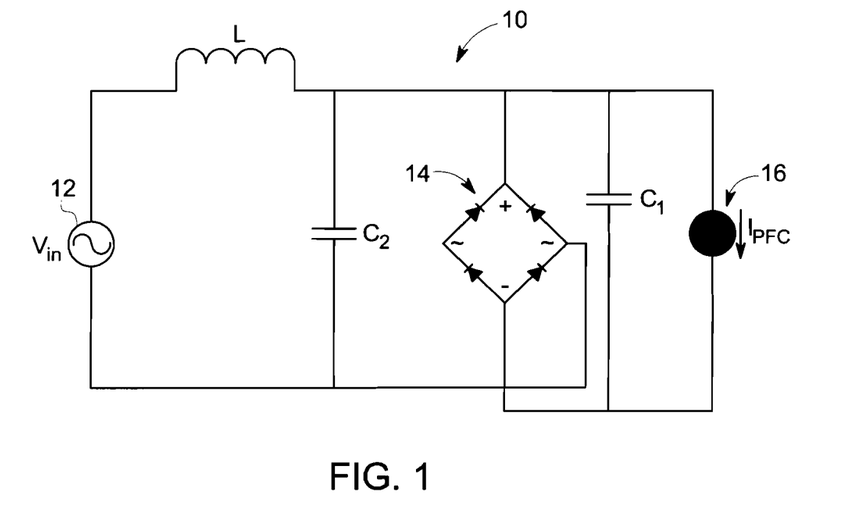
FIG. 1 is a schematic diagram illustrating a common input filter and power factor current regulator for generating a regulated sinusoidal current.

FIG. 1 is a schematic diagram illustrating a typical power factor corrector 10 that includes EMI reduction capacitors $C_1$ and $C_2$. A current regulator $I_{PFC}$ regulates the PFC converter current at the input to an LED driver, not shown. The LED driver input current $I_{IN}=(I_{PFC}+C_1\omega V_m \cos \omega t) \cdot \text{sign}(V_{in}(t))+C_2 \omega V_m \cos(\omega t)$, where $I_{PFC}$ is regulated to a sinusoid in most cases. However, at high line voltages and light loading conditions, the capacitor currents dominate, causing poor PF.

Figure 2:
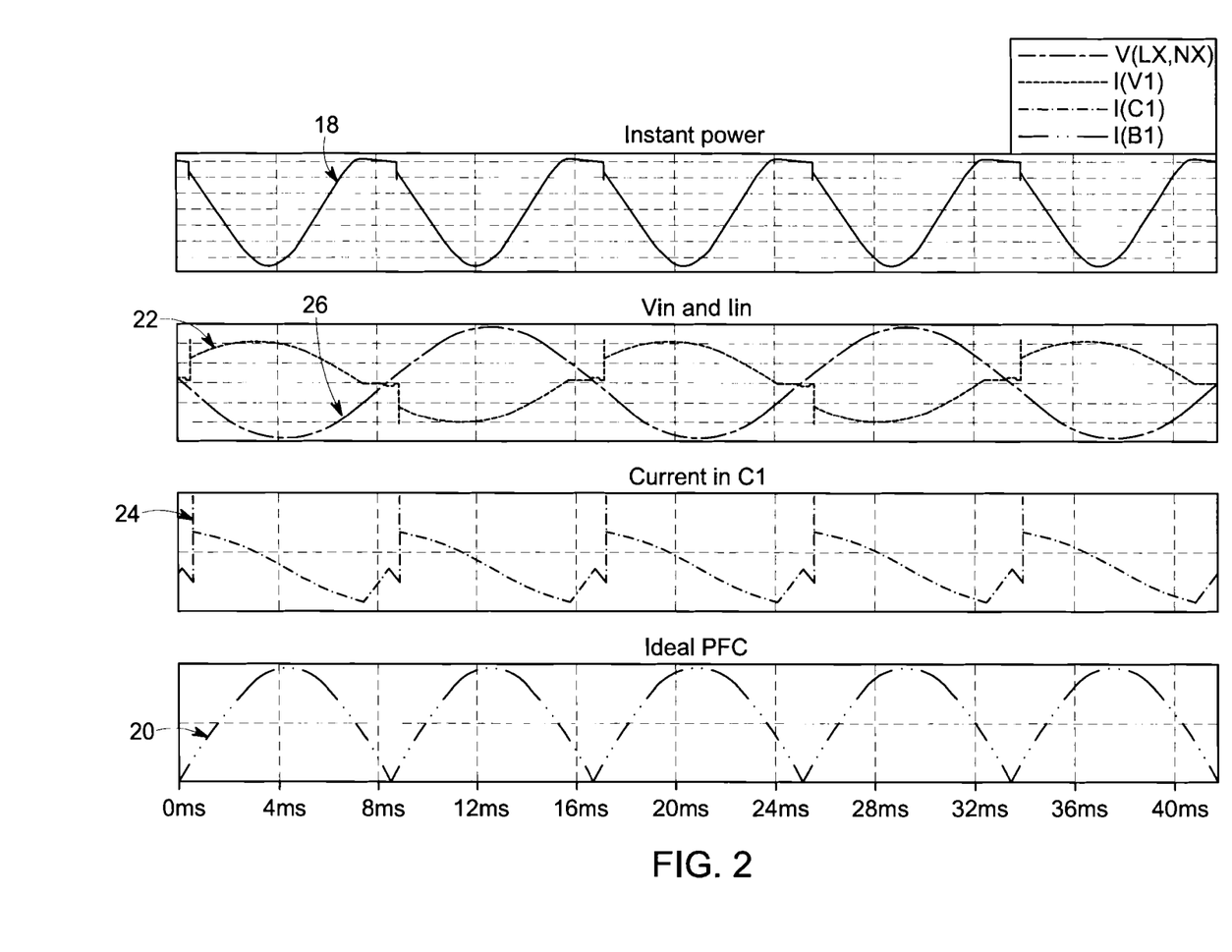
FIG. 2 is a graph illustrating several waveforms including instant power, input voltage, a power factor capacitor current, current the capacitor $C_1$ depicted in FIG. 1, and a reference current for programming the power factor corrector current.

FIG. 2 is a graph illustrating several waveforms, including instant power 18, ideal PFC current or reference current signal 20 after a diode rectifier, converter input current 22, power factor capacitor current 24 and the input voltage 26. The waveforms shown correspond to regulated current waveforms that are typical under light loading conditions. The net input current is the sum and leads the PFC converter applied voltage. The current in capacitors C1 and C2 for example, causes the input current shape to not align with the input voltage at light loads, and becomes worse at high line.

Known methods of achieving good PF at the input to an LED driver are limited in both scope and application. Applicable methods usually involve sensing the capacitor current and closing the loop to control the average input current with a feedback loop. This method however, does not translate to other known methods of power factor correction, such as a boundary conduction mode boost or a discontinuous mode Flyback converter. A need exists therefore, for a technique of controlling PF at the input to an LED driver that is not limited in both scope and application, such that the technique can be applied to a broader class of control methods.

BRIEF DESCRIPTION

According to one embodiment, a power factor controller (PFC) for light emitting diode (LED) lighting, comprises:
a boost converter for generating a boost current;
a power converter for generating a specific current as a programmable current source;
a programmable controller for estimating a phase shifted multiplier with blanking for a specific time interval;
a current regulator for generating a desired PFC current in response to an input voltage, an output load and a subsequently derived phase shifted multiplier; and
an LED driver that operates in response to a desired LED input current based at least partially on the desired PFC current.

According to another embodiment, a method of controlling power factor (PF) for light emitting diode (LED) lighting, comprises:
generating a sinusoidal input current via a boost converter, a discontinuous mode Flyback converter, or a like converter;
calculating a phase shifted and blanked multiplier via a programmable controller;
regulating the sinusoidal input current based on the phase shifted and blanked multiplier to generate a desired power factor control (PFC) current therefrom; and
operating an LED driver in response to a desired input current based at least partially on the desired PFC current.

According to yet another embodiment, a power factor controller (PFC) comprises:
a boost converter, a discontinuous mode Flyback converter, or like power factor correction topology based converter for generating a programmed current;
a programmable controller for estimating a phase shifted and blanked multiplier; and
a current regulator for generating a desired light emitting diode (LED) driver current based at least partially on the programmed current and the phase shifted and blanked multiplier.

DRAWINGS

These and other features, aspects, and advantages of the present invention will become better understood when the following detailed description is read with reference to the accompanying drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Looking again at FIG. 1, a typical arrangement is shown for a power factor correction front end 10 in an LED driver or AC/DC rectifier. An AC line 12 feeds into a diode rectifier (or equivalent bridgeless rectifier configuration) 14 with an arrangement of passive elements forming an input filter. This arrangement subsequently feeds a boost converter or Flyback converter or similar regulator 16 that can shape the current draw according to a programmed reference.

Figure 3:
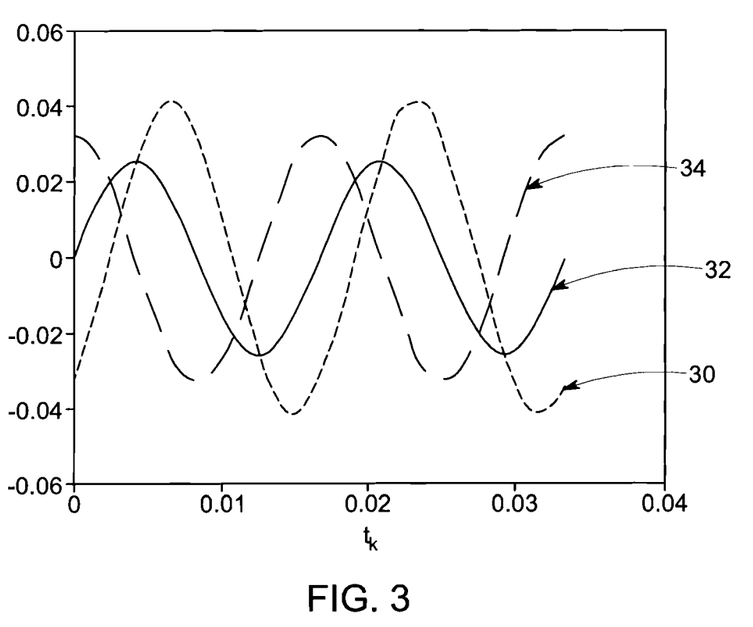
FIG. 3 is a graph illustrating a desired PFC current that is based on a desired input current and a power factor corrector input capacitor current, assuming no rectifier is present.

The concepts described herein can be better understood by first considering the simplified case where one ignores the rectifier 14. FIG. 3 is a graph illustrating a desired PFC current 30 that is based on a desired LED driver or other load input current 32 and a PFC stage current 34. With reference again to FIG. 1, without the rectifier 14, the capacitors $C_1$ and $C_2$ coalesce into one capacitor, that we shall refer to as $C_{IN}$. Thus, the desired PFC current 30 produced at the regulator 16 to ensure a perfect PF at the LED drive or load input can be determined by assuming desired LED driver input current $I_{IN}(t)=I_M \sin(\omega t)$
and  Eq. 1

PFC converter capacitor current $I_{CAP}(t)=C_{IN} dV_{IN}(t)/dt=C_{IN}V_M\cos(\omega t)$  Eq. 2 and thus, the desired PFC current $I_{PFC}(t)=I_M \sin(\omega t)-C_{IN}V_M\cos(\omega t)$.  Eq. 3

It is now seen that the desired PFC current 18 can be represented as $$I_{PFC}(t) = I_{PK}\sin\left(\omega t - \frac{\pi}{2} + \emptyset\right), \text{ if } \emptyset \text{ is known.} \quad \text{Eq. 4}$$

The desired LED driver input current can be obtained by adding the desired PFC current ($I_{PFC}$) 30 to the boost converter capacitor current 34.

If the load is modeled as a resistor, $R_{EQ}$, then $\emptyset=\tan^{-1}(\frac{1}{2}\pi F R_{EQ} C_{IN})$;  Eq. 5 and $Z_{EQ}=R_{EQ}\|(\frac{1}{2}FR_{EQ}C_{IN})$  Eq. 6 which leads to $I_{PFC}(t)=I_{PK}\sin(\omega t-\pi/2+\emptyset)$ which is the desired result as shown in Eq. 4. This result matches the desired PFC current wave shape exactly and is a phase shifted scaled version of the input sinusoid and provides an estimate of the required phase shift. This result assumes that no rectifier 14 is present, and is provided as an illustration to assist in better understanding the concepts and principles described herein.

The foregoing concepts are now extended to the case where the diode rectifier 14 is included. It can be appreciated that the current cannot flow in both directions once the rectifier 14 is added. The PFC current becomes purely positive, and assuming this case, the input current in FIG. 1 now becomes $I_{IN}(t)=(I_{PFC}(t)+C_1\omega V_m \cos(\omega t))\cdot\text{sign}(V_{in}(t)+C_2\omega V_m \cos(\omega t)$  Eq. 7

The signum function provides an unfolding mechanism. It is then desired to realize an input current $I_{IN}(t)=I_M \sin(\omega t)$, such that the delivered output power, assuming full efficiency, is $P_{OUT}=V_M I_M/2$. Thus, $I_{PFC}(t)$ must be chosen such that $(I_{PFC}(t)+C_1\omega V_m \cos(\omega t))\cdot\text{sign})V_{in}(t)+C_2\omega V_m \cos(\omega t)\approx I_m \sin(\omega t)$. Looking at FIG. 3, one can see that to compensate for the leading capacitor current with the rectifier 14, the programmed PFC current has to go negative in the initial phase. Since this is not possible with a rectifier, the best one can do is to set the current to zero to create a blanking phase. Thus, compensating for the nonlinearity now necessitates the introduction of the blanking phase in addition to the phase shift.

The blanking and phase shift can be implemented according to one embodiment with analog circuitry or can be programmed according to another embodiment, for example, using a digital microcontroller. The effect of the blanking and phase shift is shown in FIG. 6, described in further detail herein, in which the input current is now aligned with the input voltage.

Figure 4:
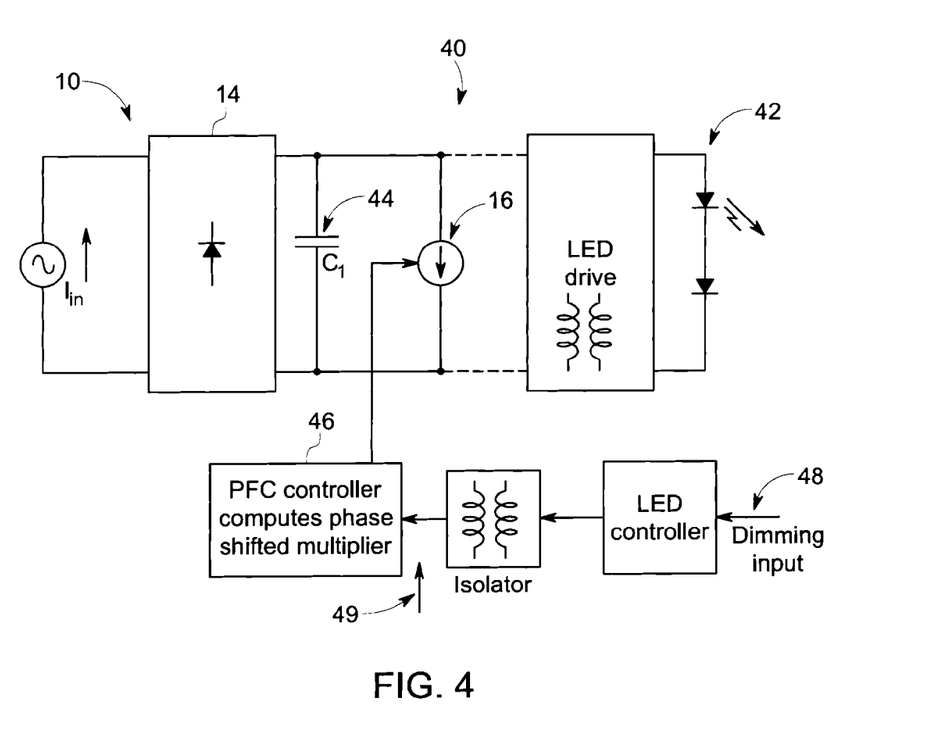
FIG. 4 is a block diagram illustrating a system for controlling a power factor of a sinusoidal AC input current for light emitting diode loads, according to one embodiment.

FIG. 4 is a simplified block diagram illustrating a system 40 for controlling a power factor of a sinusoidal input current during light loading of one or more LEDs 42, according to one embodiment. The system 40 comprises a boost or similar PFC converter 10 that includes a rectifier section 14 followed by an EMI reduction capacitor 44, such as described for one embodiment with reference to FIG. 1. The system 40 further comprises a current regulator 16 and a PFC controller 46 that is programmed to calculate a phase shifted multiplier such as the phase shifted scaled version of an input sinusoid represented in Eq. 4. An appropriate blanking interval (FIG. 6, numeral 63) such as described herein is also included. The LED load(s) 42 have output power changes based on dimming inputs 48 from a user. The LED load power changes may be fed back to the PFC controller 46 as load feedback dimming signals 49. These feedback signals 49 allow the PFC controller 46 to estimate $R_{EQ}$, discussed herein with reference to FIG. 2, and further to compute the phase shifted multiplier.

Figure 5:
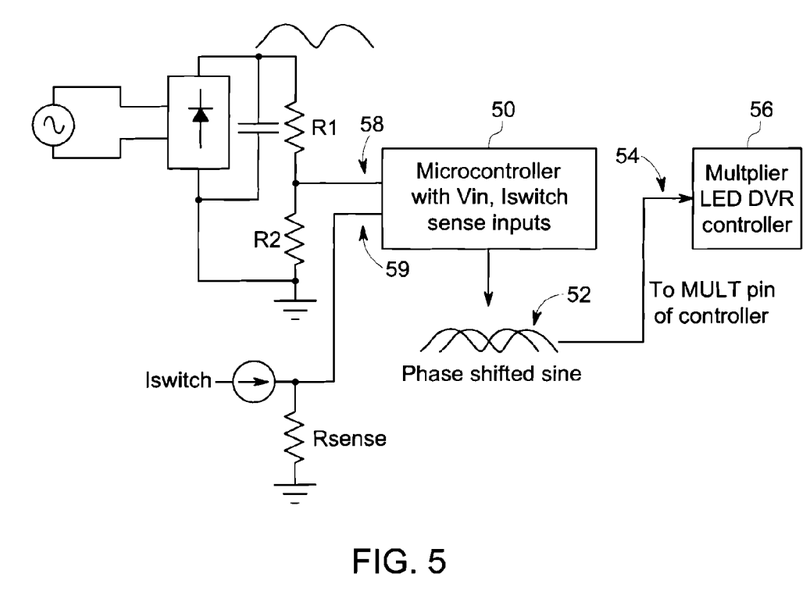
FIG. 5 is a block diagram illustrating a microcontroller that uses input voltage and current switch sense input signals to generate a phase shifted sine wave signal that is transmitted to a multiplier input of an LED driver controller to control the LED driver, according to one embodiment.

According to one embodiment, a microcontroller 50, such as depicted in FIG. 5, is used for power factor control; and a phase shifted sine/multiplier 52 generated by the microcontroller 50 is transmitted to a multiplier input section/pin 54 of an LED driver/controller 56, thus improving the PF of the LED drive/load input signal. More specifically, FIG. 5 is a block diagram illustrating a microcontroller 50 that uses input voltage and load current switch sense input signals 58, 59 to generate a phase shifted sine wave signal 52 that is communicated to the multiplier input pin 54 of the LED driver/controller 56 for controlling LED driver loads, according to one embodiment.

Figure 6:
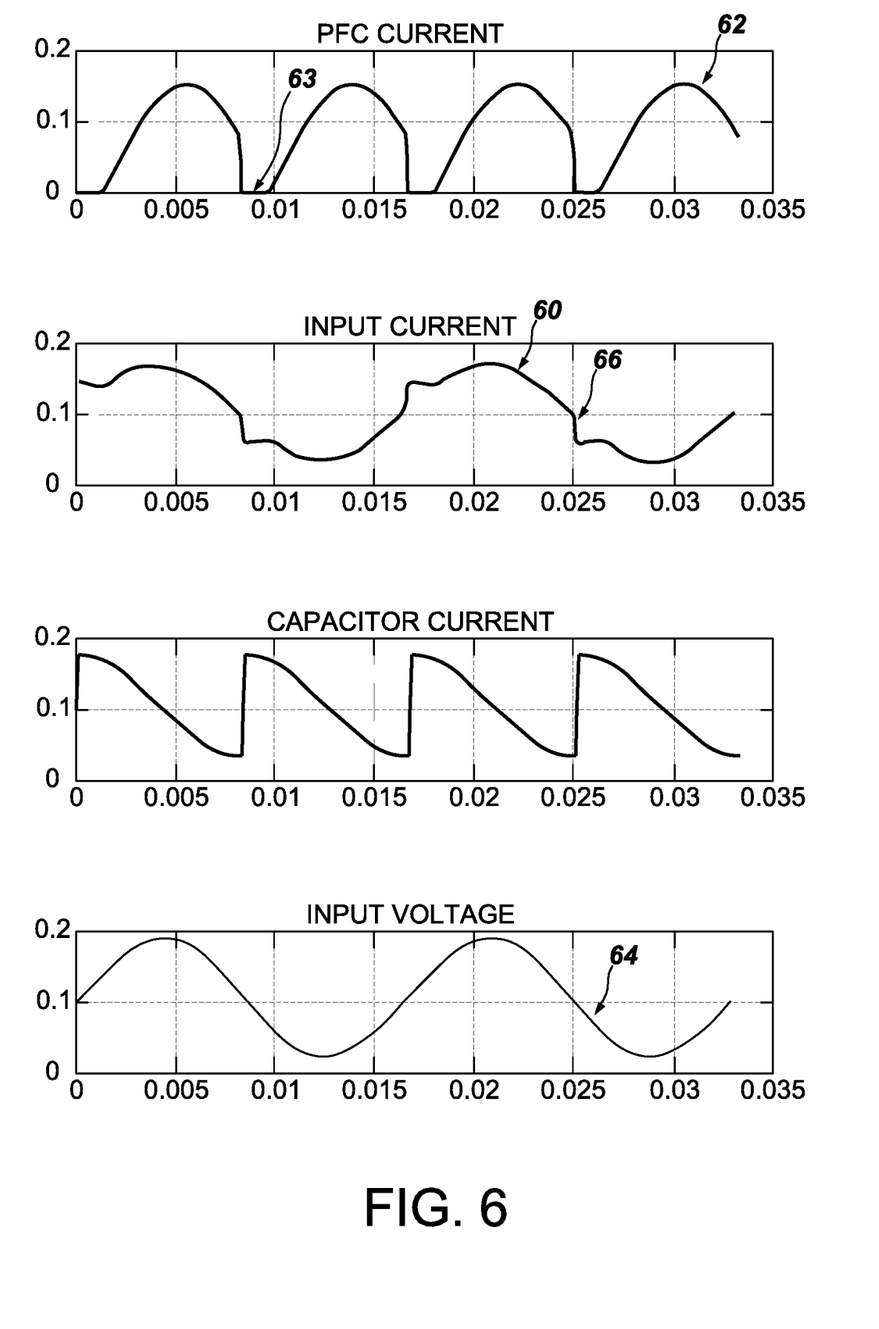
FIG. 6 is a graph illustrating several waveforms including input voltage, a power factor correction current, current the capacitor C1 depicted in FIG. 1, and a reference current (62) for programming a power factor controller current, but with the shifted and blanked reference current (62) corresponding to a shifted and blanked multiplier, yielding a much improved power factor.

FIG. 6 is a graph illustrating a boost converter regulated output current 60 that is commanded by a shift multiplier 62 to generate a desired PFC controller current, according to one embodiment. Subsequent to processing, the boost or similar PFC converter regulated output current 60 and the LED driver input voltage 64 are in sync with each other. A dip 66 in the boost or similar PFC converter regulated output current 60 is caused by a zero crossing associated with the shift multiplier 62, and has minimal effect on the LED driver input current.

The embodiments described herein assume that PFC current can be shaped. It can be appreciated that a line voltage zero crossing may prevent some portion of the PFC current from being shaped, such as the portion 66 depicted in FIG. 6. The embodiments described herein may also use load current estimates. According to some aspects, the load current(s) can be estimated from secondary, or input current(s), using a resistor in series with a boost switch.

According to one embodiment, an LED driver microcontroller employs a digital to analog converter (DAC) that can generate a sine wave and achieve good resolution at 60 Hz, even if the DAC has low resolution. Such embodiments can be used to accurately determine the input current and input voltage in a manner that can be used to estimate the PFC current $I_{PFC}$ using the principles described herein.

Figure 7:
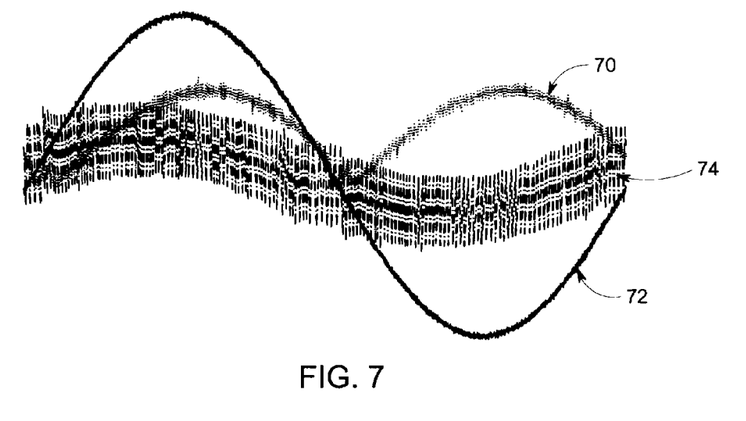
FIG. 7 is a graph illustrating an actual waveform of a phase shifted and blanked multiplier with a resulting input current.

FIG. 7 is a graph illustrating a scaled multiplier 70 that is synced to an AC line 72. The scaled multiplier 70 compensates for the capacitor current during the first part of the cycle that causes the line current 74 to be out of sync with the line voltage 72. According to some embodiments, the principles described herein can be used to achieve peak current control or average current control. Partial shaping allows insertion of capacitor compensation at desired points. Further, programmable insertion can advantageously make the compensation a function of line and load variables, e.g. current and voltage.

While the invention has been described in terms of various specific embodiments, those skilled in the art will recognize that the invention can be practiced with modification within the spirit and scope of the claims.

The invention claimed is:

1. A power factor corrector (PFC) for a predetermined electrical load, the PFC comprising:
   a boost or a Flyback converter for generating a controlled input current;
   a programmable controller for implementing a reference current signal for the boost or the Flyback converter, wherein the reference current signal is defined by a pre-settable phase shift and a blanking interval; and
   a current regulator for generating a desired PFC current in response to a load current associated with the predetermined electrical load, an input voltage associated with the boost or the Flyback converter, and the reference current signal, wherein the controlled input current is based at least partially on the desired PFC current, and further wherein a change in a load output power is fed back to the controller as a load feedback signal.

2. The PFC according to claim 1, wherein the boost or the Flyback converter comprises at least one electro-magnetic interference (EMI) reduction capacitor, wherein a current associated with the at least one EMI reduction capacitor dominates the controlled input current during light electrical loading, and further wherein light loading is defined as a load current condition where the percentage of the input current going into the EMI capacitor is comparable in magnitude to the proportion of input current delivered to the electrical load, and may be worse at higher line voltages and lighter loading conditions comprising light dimming.

3. The PFC according to claim 2, wherein the desired PFC current is based at least partially on the at least one EMI reduction capacitor current.

4. The PFC according to claim 3, wherein the desired PFC current is further based at least partially on the controlled input current.

5. The PFC according to claim 1, wherein the predetermined electrical load comprises a microcontroller that shifts an LED driver input current in response to the reference current signal.

6. The PFC according to claim 1, wherein the desired PFC current follows the reference current signal derived from an input sinusoid and the output load, wherein the reference current signal comprises a phase shift $\varnothing = (\tan^{-1})$ ($\frac{1}{2} F R_{EQ} C_{IN}$), and further wherein $R_{EQ}$ is an electrical load modeled as a resistor, F is a frequency, and $C_{IN}$ is a PFC converter input capacitance.

7. The PFC according to claim 6, wherein the reference current signal has a pre-defined blanking period corresponding to a peak of a capacitor current.

8. The PFC according to claim 7, wherein the desired PFC current is generated in response to the blanking period and the phase shift such that $I_{PFC}(t) + C_1 \omega V_m \cos(\omega t)) \cdot \text{sign}(V_{in}(t)) + C_2 \omega V_m \cos(\omega t) \approx I_m \sin(\omega t)$, wherein $C_1$ and $C_2$ are PFC converter input capacitances, $V_m$ is a capacitor voltage associated with $C_1$ and $C_2$, and $\text{sign}(V_{in}(t))$ is a signum function.

9. The PFC according to claim 1, wherein the predetermined electrical load comprises a light emitting diode (LED) driver.

10. A method of controlling a power factor (PF) for an electrical load, the method comprising:
    generating a sinusoidal input current via a PFC converter;
    calculating a phase shifted and blanked current reference via a programmable controller;
    regulating the sinusoidal input current based on the phase shifted and blanked current reference to generate a desired power factor control (PFC) current therefrom;
    operating an electrical load in response to a desired input current based at least partially on the desired PFC current; and
    feeding back a change in a load output power to the controller as a load feedback signal.

11. The method according to claim 10, further comprising:
    producing a PFC capacitor current via an electro magnetic interference (EMI) capacitor integrated with the PFC converter; and
    calculating the desired PFC current based on the PFC capacitor current and the desired input current.

12. The method according to claim 11, wherein the desired PFC current follows a signal derived from an input sinusoid and the output load, wherein the current reference comprises a phase shift defined as $\varnothing = (\tan^{-1})(\frac{1}{2} F R_{EQ} C_{IN})$, and further wherein $R_{EQ}$ is an electrical load modeled as a resistor, F is a frequency, and $C_{IN}$ is a PFC converter input capacitance.

13. The method according to claim 12, wherein the desired PFC current signal reference has a pre-defined blanking period corresponding to the peak of a capacitor current.

14. The method according to claim 10, wherein regulating the sinusoidal input current based on the phase shifted and blanked current reference to generate a desired PFC current therefrom comprises shifting the sinusoidal input current in response to the phase shifted and blanked current reference.

15. A power factor controller (PFC) comprising:
    a boost or a Flyback converter for generating a desired load input current;
    a programmable controller for estimating a phase shifted and blanked current reference; and
    a current regulator for generating a desired PFC current based at least partially on the phase shifted and blanked current reference, wherein the desired load input current is based at least partially on the desired PFC current, and further wherein a change in a load output power is fed back to the controller as a load feedback signal.

16. The PFC according to claim 15, wherein the desired load input current is further based on at least one capacitor current that dominates the generated load input current during light loading of the LED driver, wherein light loading is defined as a load current condition where the percentage of the input current going into the EMI capacitor is comparable in magnitude to the proportion of input current delivered to the load, and further wherein the load current condition may be worse at high line voltage and lighter loading conditions comprising light dimming.

17. The PFC according to claim 15, wherein the load comprises a microcontroller that shapes an input current in response to the phase shifted and blanked current reference to generate the desired load input current.

18. The PFC according to claim 15, wherein the load comprises a light emitting diode (LED) driver.

19. The PFC according to claim 15, wherein the desired PFC current is generated such that $(I_{PFC}(t)+C_1 \omega V_m \cos(\omega t)) \cdot \text{sign}(V_{in}(t))+C_2 \omega V_m \cos(\omega t) \approx I_m \sin(\omega t)$, wherein $C_1$ and $C_2$ are PFC converter input capacitances, $V_m$ is a capacitor voltage associated with $C_1$ and $C_2$, and $\text{sign}(V_{in}t))$ is a signum function.

20. The PFC according to claim 15, wherein the desired PFC current is based at least partially on the desired load input current, wherein the desired PFC current $I_{PFC}$ is approximately a sinusoid defined as $I_{PK} \sin(\omega t - \pi/2 + \emptyset)$, wherein $\emptyset = (\tan^{-1})(\frac{1}{2} FR_{EQ}C_{IN})$, and $R_{EQ}$ is a load modeled as a resistor, F is a frequency, and $C_{IN}$ is a PFC converter input capacitance.

\* \* \* \* \*